United States Patent
Hoover et al.

(10) Patent No.: US 8,891,135 B2
(45) Date of Patent: Nov. 18, 2014

(54) DETECTION OF IMAGE QUALITY DEFECTS IN GLOSS

(75) Inventors: Martin Edward Hoover, Rochester, NY (US); Vladimir Kozitsky, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 326 days.

(21) Appl. No.: 13/234,937

(22) Filed: Sep. 16, 2011

(65) Prior Publication Data

US 2013/0070277 A1 Mar. 21, 2013

(51) Int. Cl.
- *H04N 1/407* (2006.01)
- *H04N 1/60* (2006.01)
- *H04N 1/00* (2006.01)
- *G03G 15/00* (2006.01)

(52) U.S. Cl.
CPC ......... *H04N 1/6033* (2013.01); *G03G 15/6585* (2013.01); *H04N 1/00015* (2013.01); *H04N 1/00053* (2013.01); *G03G 2215/00805* (2013.01); *H04N 1/6097* (2013.01); *G03G 15/5062* (2013.01); *H04N 1/00045* (2013.01); *H04N 1/00031* (2013.01)
USPC ........... 358/3.27; 358/1.9; 358/3.01; 358/504

(58) Field of Classification Search
CPC .......... H04N 1/00002; H04N 1/00005; H04N 1/00026; H04N 1/6033; H04N 1/407; H04N 1/4072; H04N 1/409; G06T 5/008; G06T 2207/20172
USPC ......................... 358/1.9, 406; 399/49, 60, 72; 348/217.1, 254, 246
See application file for complete search history.

(56) References Cited

U.S. PATENT DOCUMENTS

| | | | |
|---|---|---|---|
| 6,975,949 B2 | 12/2005 | Mestha et al. | |
| 7,764,893 B2 | 7/2010 | Banton et al. | |
| 2010/0046968 A1 | 2/2010 | Hamby et al. | |
| 2010/0272453 A1* | 10/2010 | Fujiwara | 399/27 |
| 2011/0242556 A1* | 10/2011 | Jinno et al. | 358/1.9 |

* cited by examiner

*Primary Examiner* — Marivelisse Santiago Cordero
*Assistant Examiner* — Kent Yip
(74) *Attorney, Agent, or Firm* — Pillsbury Winthrop Shaw Pittman, LLP

(57) ABSTRACT

A method for detecting gloss non-uniformities on printed documents is provided. The method includes printing a test pattern using a print engine, the test pattern having gloss; directing one or more light beams, using an illuminator, onto the test pattern to produce at least generally specular reflectance; scanning the test pattern, using a linear array sensor, to obtain image data, the image data corresponding to the generally specular reflectance from the test pattern; and enhancing contrast of the image data to facilitate detection of image quality non-uniformities in the gloss in the test pattern.

12 Claims, 6 Drawing Sheets

DETECTION OF IMAGE QUALITY DEFECTS IN GLOSS

BACKGROUND

1. Field

The present disclosure relates to a method and a system for detecting gloss non-uniformities on printed documents.

2. Description of Related Art

An electrophotographic marking is a well known and commonly used method of copying or printing documents. Electrophotographic marking is performed by exposing a light image representation of a desired document onto a substantially uniformly charged photoreceptor. In response to that light image the photoreceptor discharges so as to create an electrostatic latent image of the desired document on the photoreceptor's surface. Toner particles are then deposited onto that latent image so as to form a toner image. That toner image is then transferred from the photoreceptor onto a substrate such as a sheet of paper. The transferred toner image is then fused to the substrate, usually using heat and/or pressure. The surface of the photoreceptor is then cleaned of residual developing material and recharged in preparation for the production of another image.

Many documents produced by such process, and especially, color image printing process, have a need for a uniform, high gloss. Gloss is the property of a substrate surface which involves specular reflection. Specular reflection is a sharply defined light beam resulting from reflection off a smooth, uniform surface. Gloss follows the law of reflection which states that when a ray of light reflects off a surface, the angle of incidence is equal to the angle of reflection. Gloss properties are generally measured in Gardner Gloss Units (ggu). Gloss varies due to various factors, including paper properties, toner properties and toner mass per unit area (TMA), oil levels, fuser roll age, and temperature variability.

Image quality defects in gloss are common across different image printing systems. For example, such image quality defects in gloss may include transfer roller ghosting (e.g., in solid inkjet printing), edge wear streaks, etc.

The transfer roller ghosting is caused by a previous impression left behind a residual imprint of oil on a transfer roller that is subsequently imparted on the finish surface of a subsequent print while being transfixed.

Many fuser issues may also lead to non-uniform gloss or a gradual change in gloss as the fuser ages. Examples of fuser roll induced gloss defects include edge wear streaks, oil streaks, and air knife streaks such as from cool rings (due to non-uniform cooling of the fuser roll or recording medium after fusing) and random wavy gloss and gloss reduction as material accumulates on the roll that contacts the image. The edge wear streaks in gloss, for example, are caused by a worn fuser roller of the image printing system. Post fuser temperature disparities also alter the image gloss. Post fuser gloss defects include belt hole artifacts from the post fuser belt transport.

Document scanners are typically used in image quality measurement methods to capture scanned images of the prints being measured. For example, these image quality measurement methods are developed to quantify print quality defects such as uniformity (streaks and bands), mottle & graininess, line and text quality, color quality and so on. However, document scanners typically are designed to be insensitive to imaging of gloss and as such they are not capable of detection of image quality non-uniformities or defects in gloss.

SUMMARY

According to one aspect of the present disclosure, a computer-implemented method for detecting gloss non-uniformities on printed documents is provided. The method is implemented in a computer system comprising one or more processors configured to execute one or more computer program modules. The method includes printing a test pattern using a print engine, the test pattern having gloss; directing one or more light beams, using an illuminator, onto the test pattern to produce at least generally specular reflectance; scanning the test pattern, using a linear array sensor, to obtain image data, the image data corresponding to the generally specular reflectance from the test pattern; and enhancing contrast of the image data to facilitate detection of image quality non-uniformities in the gloss in the test pattern.

According to another aspect of the present disclosure, a system for detecting gloss non-uniformities on printed documents is provided. The system comprises a print engine, an illuminator, a linear array sensor, and a processor. The print engine is configured to print a test pattern. The test pattern having gloss. The illuminator is configured to direct one or more light beams onto the test pattern to produce at least generally specular reflectance. The linear array sensor is configured to scan the test pattern to obtain image data. The image data corresponds to the generally specular reflectance from the test pattern. The processor is configured to enhance contrast of the image data to facilitate detection of image quality non-uniformities in the gloss in the test pattern.

Other objects, features, and advantages of one or more embodiments of the present disclosure will seem apparent from the following detailed description, and accompanying drawings, and the appended claims.

BRIEF DESCRIPTION OF THE DRAWINGS

Various embodiments will now be disclosed, by way of example only, with reference to the accompanying schematic drawings in which corresponding reference symbols indicate corresponding parts, in which.

DETAILED DESCRIPTION

Figure 1:
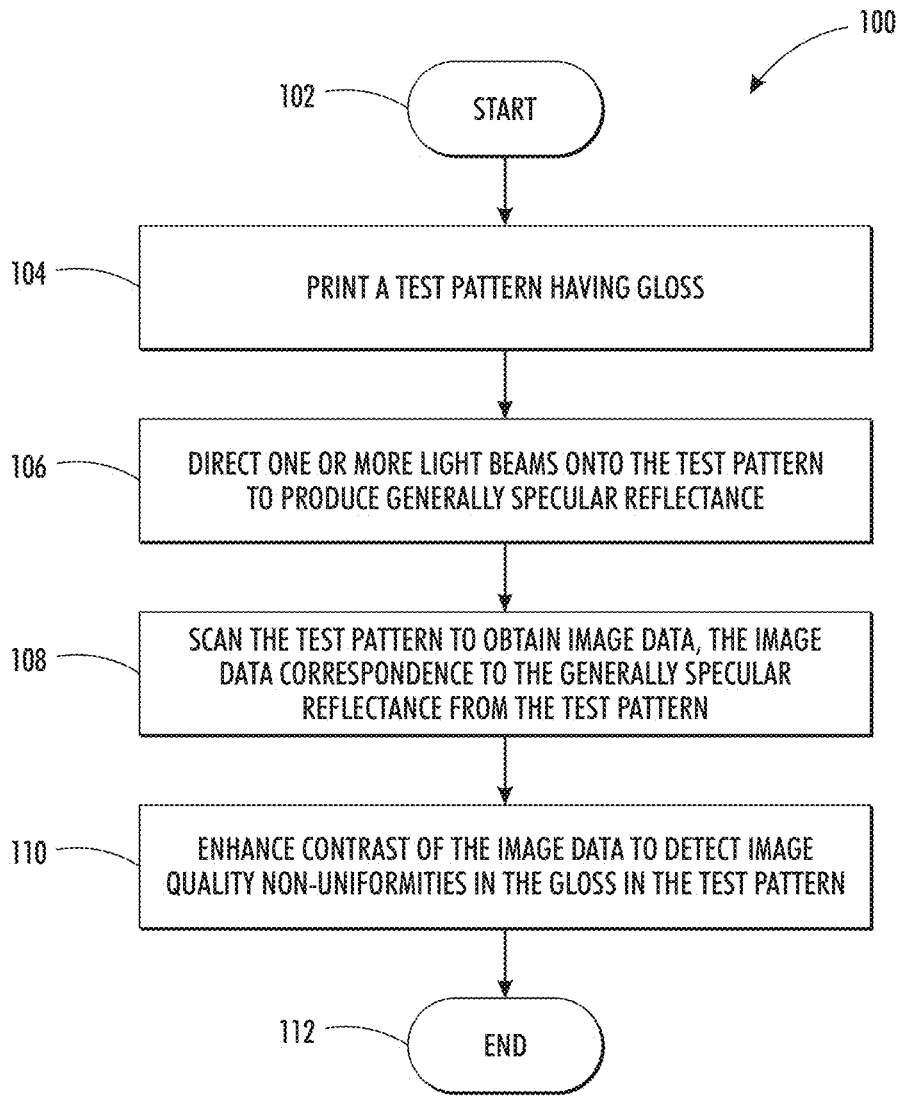
FIG. 1 illustrates a method for detecting gloss non-uniformities on printed documents in accordance with an embodiment of the present disclosure.

The law of reflection states that the direction of outgoing reflected light and the direction of incoming light make the same angle with respect to the surface normal. Specular reflection is the perfect, mirror-like reflection of light from a surface, in which light from a single incoming direction is reflected into a single outgoing direction. In contrast, diffuse reflection is reflection of light from a surface, in which light from a single incoming direction is reflected in many directions, due to surface irregularities that cause the rays of light to reflect in different outgoing directions. The type of reflection depends on the structure of the surface. For example, while both matte and glossy prints exhibit a combination of specular and diffuse reflection, matte prints have a higher proportion of diffuse reflection and glossy prints have a greater proportion of specular reflection.

The present disclosure proposes a method and a system for in-situ detection of image quality defects in gloss. The method of the present disclosure image scans test prints using an inline full width array (FWA) sensor that is configured with specular mode illumination. In order to detect image quality defects in gloss the scanned image should include specular reflective image signal. The resulting specular mode scanned images are image processed to enhance contrast and facilitate detection of specific image defects of interest (e.g., non-uniformities or defects in gloss).

In one embodiment, contrast enhancement amplifies the signal of the specular image more into the dynamic range of the image gray levels bit depth. Dynamic range of the original captured or scanned digital image includes all the gray levels from dark (low gray level) to light (high gray level). The specular reflective image signal or specular reflective image data is located in the dark (low) gray level portion of the full dynamic range of the original captured or scanned digital image. During contrast enhancement, the specular reflective image signal or specular reflective image data located in the dark or low gray levels of the original captured or scanned digital image is extracted, scaled and offset so as to amplify the specular reflective image signal (or specular reflective image data) into the dynamic range of the digital image. The contrast enhancement, thus, prepares the scanned image for subsequent signal processing, for example, by separating the specular reflective image portion (that of interest) of the scanned image.

The present disclosure helps in diagnosing and resolving image defects, such as transfer roller ghosting. Paper edge wear streaks that may occur on fuser rollers in Xerographic printing systems may also be diagnosed and resolved using the method and system of the present disclosure.

In case of roller ghosts, the enhanced image is further processed with respect to the test target. Test target generally includes regions of interest such as different sized text and square patch areas. Ghosted regions are formed in the scanned and/or enhanced image that correspond to these regions of interest. During processing, the ghosted regions are identified in the scanned and enhanced image to measure level of ghost defect. Thus, the processing of the enhanced image is specific to the test target for roller ghost.

FIG. 1 illustrates a computer-implemented method 100 for detecting gloss non-uniformities on printed documents in accordance with an embodiment of the present disclosure. The method 100 is implemented in a computer system comprising one or more processors configured to execute one or more computer program modules.

The method 100 begins at procedure 102. At procedure 104, a print engine 204 is configured to print a test pattern having gloss. The print engine 204 is shown and described with respect to FIG. 2. Gloss is the property of a test pattern surface which involves specular reflection. Gloss follows the law of reflection which states that when a ray of light reflects off a surface, the angle of incidence is equal to the angle of reflection.

Next at procedure 106, an illuminator 205 is configured to emit one or more light beams onto the test pattern, thereby producing at least generally specular reflectance from the test pattern. The illuminator 205 may include at least one of the group consisting of a linear LED array, a lamp, a lamp with a reflector and a collimated light source. The illuminator 205 is shown and described with respect to FIG. 2.

At procedure 108, a linear array sensor 206 is configured to scan the test pattern to obtain image data. The linear array sensor 206 may include a full-width array (FWA) sensor, a contact image sensor, a CMOS array sensor or a CCD sensor. The linear array sensor 206 is shown and described with respect to FIG. 2.

Figure 3A:
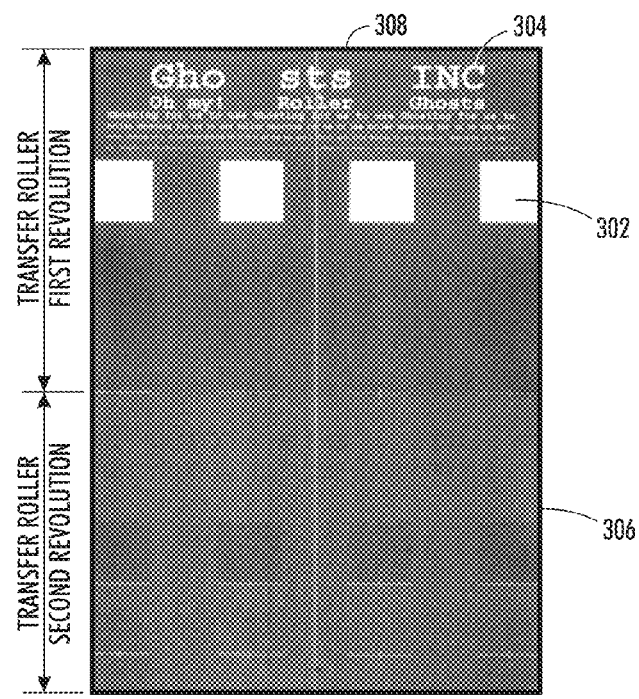
FIGS. 3A and 3B illustrate a scanned image and a contrast enhanced image in accordance with an embodiment of the present disclosure.

The image data corresponds to the generally specular reflectance from the test pattern. FIG. 3A illustrates an exemplary scanned image in accordance with an embodiment of the present disclosure. As can be seen from FIG. 3A, it is hard to identify or detect certain types of gloss non-uniformities using this exemplary scanned specular gloss image. This is mainly because the gloss non-uniformity signal is low in amplitude and its range is biased towards the dark low reflectance region.

Therefore, at procedure 110, a processor 208 is configured to enhance contrast of the image data to detect image quality non-uniformities in the gloss in the test pattern.

In one embodiment, contrast enhancement algorithms may be used to bring out the detail from the dark area allowing the image quality non-uniformities in the gloss to be detected. Unlike standard contrast enhancement methods that take into account the entire dynamic range of the input image, processor 208 is configured to enhance contrast on the dark levels of the image data. The specular reflected image signal is generally located in these dark (or low gray) levels of the image data. In one embodiment, the processor 208 excludes the light levels of the image data during contrast enhancement because the specular reflected image signal (that is of interest) is generally located in the dark (or low gray) levels of the image data.

Figure 6A:
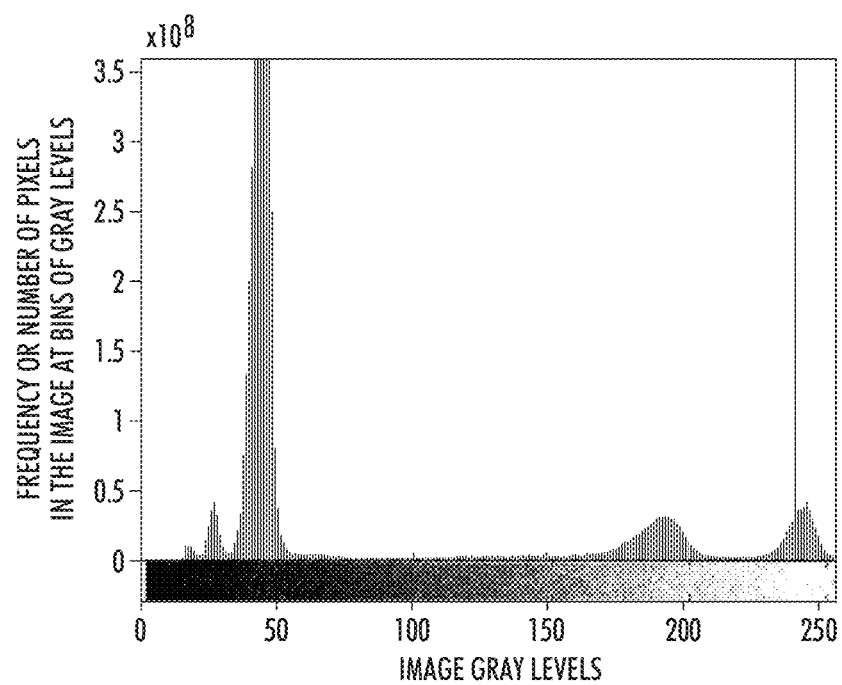
FIGS. 6A and 6B show graphs of the scanned image signal before and after contrast enhancement in accordance with an embodiment of the present disclosure.
Figure 6B:
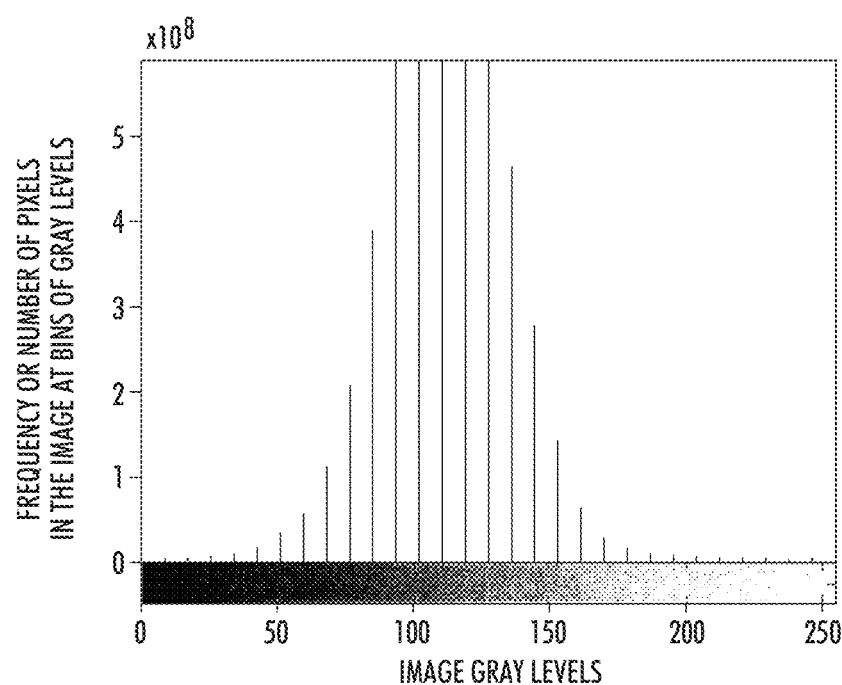

FIG. 6A shows a graph of the scanned digital image before contrast enhancement. The graph of FIG. 6A shows the scanned digital image with specular reflective image signal (or specular image data) located in lower (dark) gray levels of the scanned image. FIG. 6B shows a graph of the scanned digital image after contrast enhancement. The graph of FIG. 6B shows the scanned digital image with specular reflective image signal (or specular image data) amplified into the dynamic range of the scanned image. As noted earlier, the contrast enhancement amplifies the specular reflective image signal (or specular image data) into the dynamic range of the scanned digital image by extracting, scaling and offsetting the specular reflective signal of the image data. The graphs in FIGS. 6A and 6B illustrate frequency or number of pixels in the image at bins of gray levels along a vertical Y-axis. On a horizontal X-axis, the graphs illustrate image gray levels, which is represented in 8-bit (0 to 255).

Figure 3B:
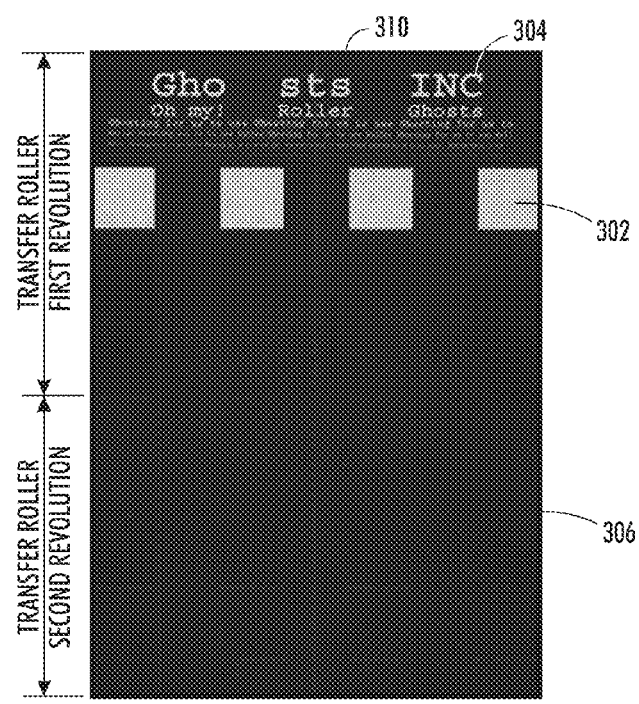

FIG. 3B illustrates a contrast enhanced image in accordance with an embodiment of the present disclosure. As can be seen from FIG. 3B, contrast enhancement brings out the detail in the scanned specular gloss image and allows for detection of the image quality non-uniformities in the gloss.

The processor 208 subsequently processes the contrast-enhanced gloss image in order to detect and quantify the level of the image quality defects or non-uniformities in the gloss. The image quality non-uniformities comprise at least one of the group consisting of transfer roller ghosting and paper edge wear. The processor 208 is shown and described with respect to FIG. 2.

The method 100 of sensing and processing of test prints or test patterns may be integrated into the image printing system 202 to enable detection for use as an automatic diagnostic tool or may also be used as feedback to enable a controller 210 to adjust actuators configured to mitigate the image quality defects in gloss.

The method 100 may include a procedure where the controller 210 is configured to receive the contrast enhanced gloss image and to adjust at least one actuator of an image printing system 202 (shown and described with respect to FIG. 2) to minimize the image quality non-uniformities in the gloss based on the contrast enhanced gloss image. The method 100 ends at procedure 112.

Figure 2:
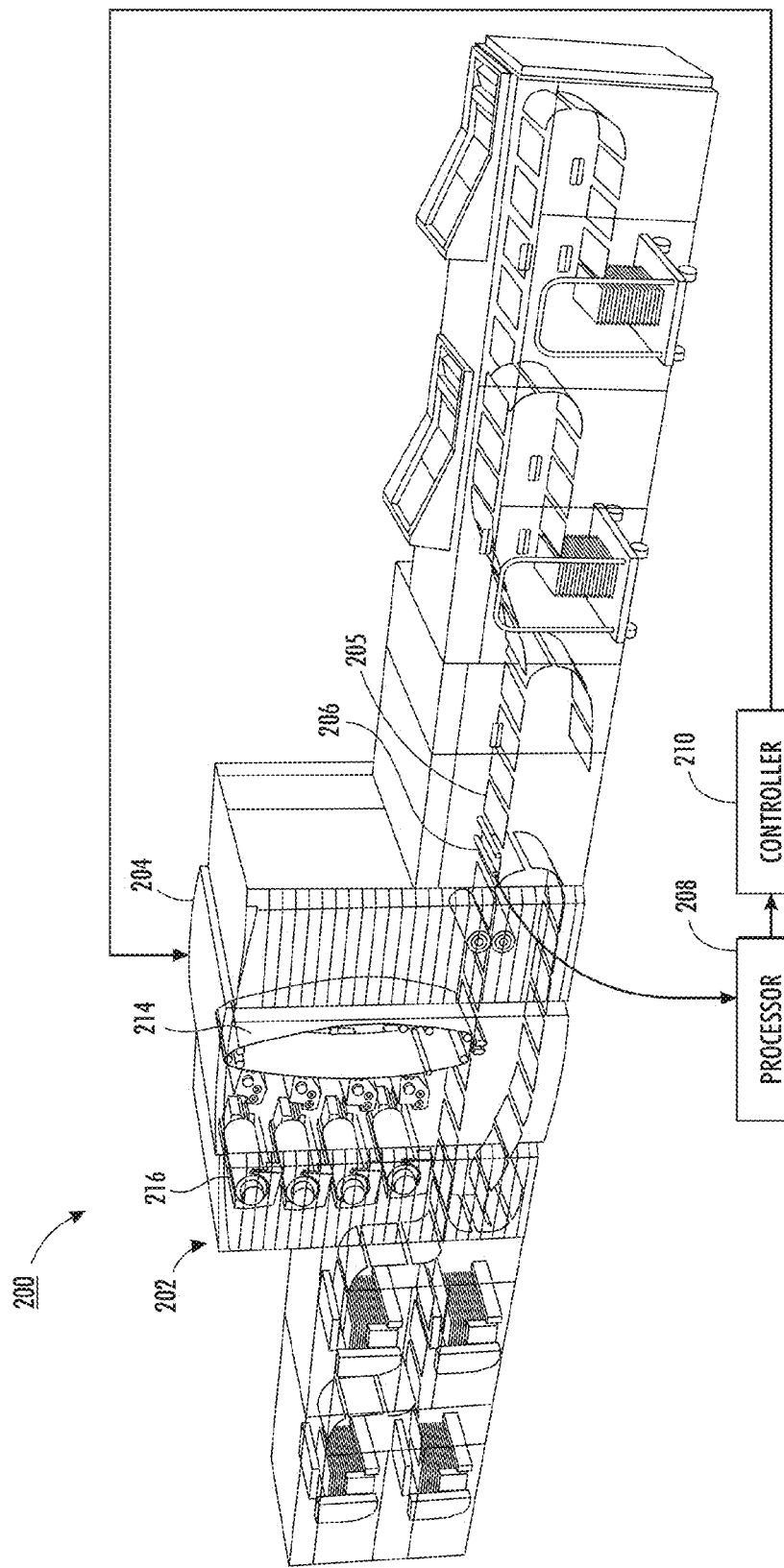
FIG. 2 illustrates a system for detecting gloss non-uniformities on printed documents in accordance with an embodiment of the present disclosure.

FIG. 2 illustrates a system 200 for detecting gloss non-uniformities on printed documents in accordance with an embodiment of the present disclosure. The system 200 includes the print engine 204, the illuminator 205, the linear array sensor 206, the processor 208, and the controller 210.

As illustrated, the print engine 204 is a multi-color engine having a plurality of imaging/development subsystems 216 that are suitable for producing individual color images (e.g., CMYK) on the image bearing surface 214, where the image bearing surface 214 then transfers the images to the substrate. The image printing system 202 also includes a source of paper (media) or printable substrates.

As is generally known, to generate an output copy of an input document, the image bearing surface 214 is charged using a corona charger (not shown) and then exposed to a raster output scanner (ROS) or laser (not shown) to form the latent image on the image bearing surface 214. Toner is applied to the latent image from a plurality of developer units 216. The toner applied to the latent image is transferred to the output media at a transfer station. The output media is moved by a transport mechanism to a fuser so that the toner is permanently affixed to the output media.

The print engine 204 is configured to print the test pattern having gloss. Detection of image quality defects in gloss starts with scanning test prints with a document scanning system that is designed to include specular reflected light.

The illuminator 205 is implemented as a light source. In one embodiment, a linear LED array may be used in conjunction with the linear array sensor 206, as disclosed, for example, in U.S. Pat. No. 6,975,949, which herein is incorporated by reference in its entirety. The linear LED array could also use just one row of LEDs. The combination of a linear array sensor and linear LED array allows for high spatial resolution (e.g., 600 spi) in both the process and cross-process directions. The LED arrays could be all one color, e.g., white or of multiple colors, as described in U.S. Pat. No. 6,975,949. Also, the illuminator may be a lamp, or may consist of a lamp on side of the linear array sensor and a reflector on the other side. A collimated light beam may yield a greater of ratio of specular reflectance.

A cylindrical lens arrangement (not shown) may also be placed in the optical path of the specular illuminator 205 to minimize diffuse illumination, further reduced with baffles and/or field stops, along the illumination width. Ideally, collimation of the specular illuminator 205 may help to insure more sharply defined specular image capture.

In one embodiment, the linear array sensor 206 is a full width array (FWA). In general, a full width array sensor is defined as a sensor that extends substantially an entire width (perpendicular to a direction of motion) of the moving image bearing surface 214 (e.g., photoreceptor belt). The full width array sensor is configured to detect any desired part of the printed image or control patches, while printing real images. The full width array sensor may include a plurality of sensors equally spaced at intervals (e.g., every 1/600th inch (600 spots per inch)) in the cross-process (or a fast scan) direction. See, for example, U.S. Pat. No. 6,975,949, incorporated herein by reference. It is understood that other linear array sensors may also be used, such as contact image sensors, CMOS array sensors or CCD array sensors. Although the full width array (FWA) sensor or contact sensor is shown in the illustrated embodiment, it is contemplated that the present disclosure may use sensor chips that are significantly smaller than the width of the image bearing surface 214, through the use of reductive optics. In one embodiment, the sensor chips may be in the form of an array that is, for example, one or two inches long and that manages to detect the entire area across the image bearing surface 214 through reductive optics. In one embodiment, the processor 208 is provided to both calibrate the linear array sensor and to process the reflectance data detected by the linear array sensor. It could be dedicated hardware like ASICs or FPGAs, software, or a combination of dedicated hardware and software.

In one embodiment, a full width array (FWA) image module is used with a Xenon florescent tube lamp. The lamp is tilted, for example, approximately 22.5° to include specular reflected light. That is, the light from the lamp is reflected off of the surface of the test print being scanned directly into the lens of scan image module.

The linear array sensor 206 is configured to scan the test pattern to obtain the image data. The image data corresponds to the generally specular reflectance from the test pattern. As noted above, it is hard to identify or detect gloss non-uniformities using the scanned specular gloss image.

Therefore, the processor 208 is used to enhance contrast of the image data to detect image quality non-uniformities in the gloss in the test pattern. That is, after the specular mode image is scanned, the resulting image is processed to enhance contrast and bring out the detail in the gloss image. In one embodiment, the processor 208 is configured to enhance contrast of dark or low gray levels of the image data. The processor 208 is configured to extract, scale and offset specular signal in the image data so as to amplify the specular signal into a dynamic range of the image data.

The processor 208 can comprise either one or a plurality of processors therein. Thus, the term "processor" as used herein broadly refers to a single processor or multiple processors. In one embodiment, the processor 208 can be a part of or forming a computer system. The system 200 may include a memory to store data received and data generated by the processor 208.

The image quality non-uniformities in gloss may include at least one of the group consisting of transfer roller ghosting and edge wear. The image quality non-uniformity may also include gloss defects such as "orange peel," which has a relatively small feature pattern. Gloss defects may be detected by using a test target having uniform diffuse image signal (i.e., a solid black background) and by using contrast enhancement.

The controller 210 of the system 200 may be configured to adjust at least one actuator of the image printing system 202 to minimize the image quality non-uniformities in the gloss.

The actuators may be configured to control various parameters including fuser roll temperature, dwell time in fuser roll nip, process speed, additional heat energy supplied, nip width of the fuser roll nip and pressure on the fuser rolls. For example, fuser roll temperature and dwell time in the fuser roll nip typical of the fusing systems may be readily adjusted with, additional heat energy applied or process speed. In one embodiment, the actuators may be, for example, an actuator for the fuser roll heater. The nip width and the process speed together determine the dwell time.

The method and the system of the present disclosure may be used for detection and quantification of a transfer roller ghost print defect.

FIGS. 3A and 3B illustrate the scanned image 308 and the contrast enhanced image 310 in accordance with an embodiment of the present disclosure. These images are results from experimental testing and development of the method 100 of the present disclosure, which is used for detection and quantification of a transfer roller ghosting (print defect).

The test patterns 308 and 310, shown in FIGS. 3A and 3B, include high area coverage of solid ink with solid area white patches (or effective holes) 302 in the dark (e.g., black) solid ink background and strings of a sweep of various size text 304. The test patterns 308 and 310 generally span two transfer roller revolutions. That is, the test patterns 308 and 310, each include a first transfer roller revolution portion and a second transfer roller revolution portion. The first transfer roller revolution portion includes valid marks (e.g., solid area patches (or effective holes) 302 or text 304) in white. The second transfer roller revolution portion should include all dark (e.g., black) background but includes remnant marks (302 or 304) from the first revolution. These remnant marks are generally referred to as transfer roller ghosting.

These solid area white patches (or effective holes) 302 in the dark (e.g., black) sold ink background get imparted into the gloss image on the solid black area 306 below on the subsequent second revolution of the transfer roller.

The image shown in FIG. 3A includes the low contrast specular gloss image. The transfer roller ghosting is not clearly seen from the image shown in FIG. 3A because of this low contrast (i.e., the signal is down in the dark levels).

As noted above, the image of FIG. 3A is contrast enhanced to bring out the detail from the dark area allowing the image defects in the gloss to be detected. Subsequent processing of the contrast enhanced gloss image is then used to detect and quantify the level of the image defect in the gloss.

A scan of the print with the FWA mounted normal to the surface (diffuse reflective only mode) looks similar to the image in FIG. 3A but does not include the gloss image signal. The contrast enhancement of the diffuse only image does not provide gloss signal.

In another embodiment, the processor 208 is configured to process the image data by determining a difference (e.g., subtract) between two images, one that includes both specular and diffuse reflectance and other that includes only diffuse reflectance. The resulting difference image attempts to isolate the specularly reflected image only. This procedure requires scanning the image (having gloss) twice, for example, by changing the orientation of the sensor (and/or illuminator) module. The method also requires good registration and repeatable geometry of the two scanned images otherwise differences between the two scanned (diffuse) images become noise.

Figure 4:
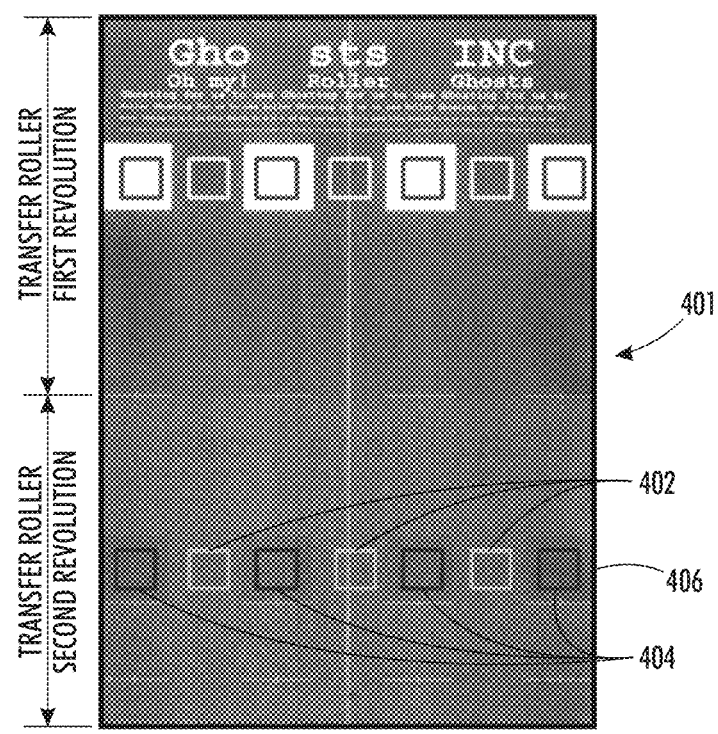
FIG. 4 illustrates a scanned image used to determine ghosting in accordance with an embodiment of the present disclosure.

FIG. 4 illustrates a scanned image used to determine ghosting in accordance with an embodiment of the present disclosure. The ghosting is generally determined using algorithms. For example, the ghosting is determined by calculating absolute value of a difference between mean gray level of pixels in the first squares 402 and mean gray level of pixels in the second squares 404. As shown in the FIG. 4, both the first and second squares 402 and 404 are in the transfer roller second revolution portion 406 of the image 401. This determined difference should nominally be zero.

Figure 5:
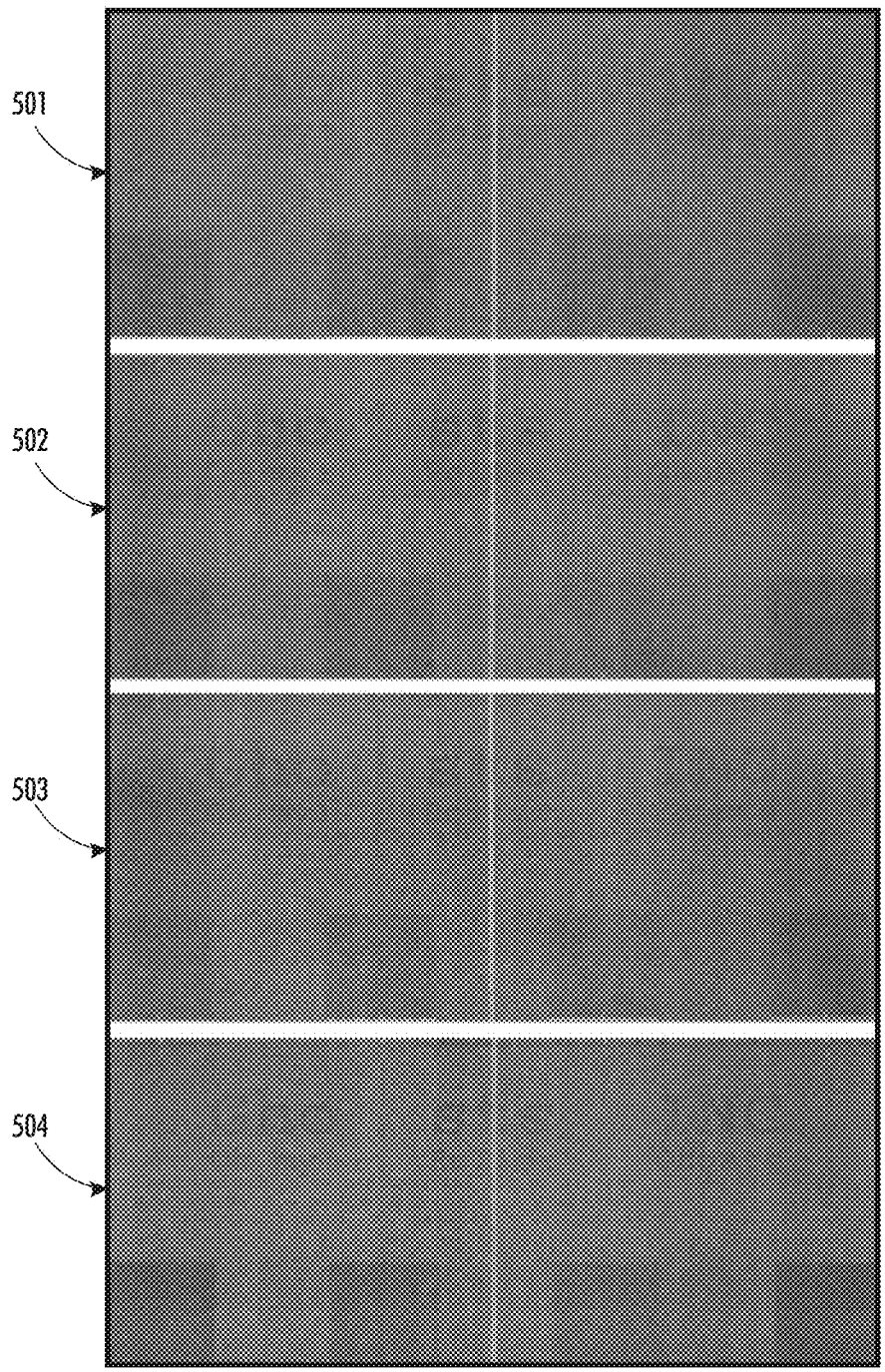
FIG. 5 illustrates exemplary test patterns used to quantify measurement of transfer roller ghosting in accordance with an embodiment of the present disclosure.

FIG. 5 illustrates exemplary test patterns 501-504 used to quantify measurement of transfer roller ghosting in accordance with an embodiment of the present disclosure. Table 1 shows a ghost metric for these exemplary test patterns 501-504 determined using the method and system of the present disclosure. The ghost metric indicates that test pattern 504 has highest ghosting, followed by test pattern 502, test pattern 501, and test pattern 503.

TABLE 1

| | GHOST METRIC | | |
|---|---|---|---|
| | First Scan | Second Scan | Average Value |
| Test Pattern 501 | 14.1 | 14.2 | 14.2 |
| Test Pattern 502 | 15.8 | 15.6 | 15.7 |
| Test Pattern 503 | 13.3 | 13.5 | 13.4 |
| Test Pattern 504 | 16.9 | 16.9 | 16.9 |

Results shown above indicate the system 200 is capable of detecting gloss defects and is capable of outputting a ghosting measurement metric that matches the (SIR) Standard Image Reference (visual assessment scale) that is currently being used to assess the level of the ghosting defect.

The disclosed method is configured to measure gloss differences at higher spatial frequency of interest to image quality metrics. The present disclosure eliminates the guess work associated with visual inspection and ranking of the transfer roller ghosting. In the disclosed method, measuring of gloss can be done inline in-situ to printing process. This enables automatic control and/or diagnostic of the image quality defects in gloss.

In the embodiments of the present disclosure, the processor, for example, may be made in hardware, firmware, software, or various combinations thereof. The present disclosure may also be implemented as instructions stored on a machine-readable medium, which may be read and executed using one or more processors. In one embodiment, the machine-readable medium may include various mechanisms for storing and/or transmitting information in a form that may be read by a machine (e.g., a computing device). For example, a machine-readable storage medium may include read only memory, random access memory, magnetic disk storage media, optical storage media, flash memory devices, and other media for storing information, and a machine-readable transmission media may include forms of propagated signals, including carrier waves, infrared signals, digital signals, and other media for transmitting information. While firmware, software, routines, or instructions may be described in the above disclosure in terms of specific exemplary aspects and embodiments performing certain actions, it will be apparent that such descriptions are merely for the sake of convenience and that such actions in fact result from computing devices, processing devices, processors, controllers, or other devices or machines executing the firmware, software, routines, or instructions.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential features hereinbefore set forth and followed in the spirit and scope of the appended claims.

What is claimed is:

1. A computer-implemented method for detecting gloss non-uniformities on printed documents, wherein the method is implemented in a computer system comprising one or more processors configured to execute one or more computer program modules, the method comprising:

printing a test pattern using a print engine, the test pattern having gloss;

directing one or more light beams, using an illuminator, onto the test pattern to produce at least generally specular reflectance;

scanning the test pattern, using a linear array sensor, to obtain image data, the image data including specular reflective image data that corresponds to the generally specular reflectance from the test pattern; and enhancing contrast of the specular reflective image data in darker or lower gray levels of the image data to facilitate detection of image quality non-uniformities in the gloss in the test pattern, wherein the enhancing contrast includes amplifying only the specular reflective image data in darker or lower gray levels of the image data, excluding all of the image data in light or higher gray levels that does not correspond to the gloss, into a dynamic range of the image data so as to detect and quantify the image quality non-uniformities in the gloss in the test pattern.

2. The method according to claim 1, further comprising adjusting at least one actuator of an image printing system to minimize the image quality non-uniformities in the gloss based on the contrast enhanced specular reflective image data.

3. The method according to claim 1, wherein the image quality non-uniformities comprises at least one of the group consisting of transfer roller ghosting and edge wear.

4. The method according to claim 1, wherein the illuminator comprises at least one of the group consisting of a linear LED array, a lamp, a lamp with a reflector, and a collimated light source.

5. The method according to claim 1, wherein the linear array sensor is a full-width array (FWA) sensor, a contact image sensor, a CMOS array sensor or a CCD sensor.

6. The method according to claim 1, wherein the enhancing contrast includes extracting, scaling and offsetting the specular reflective image data in the image data so as to amplify the specular reflective image data into the dynamic range of the image data.

7. A system for detecting gloss non-uniformities on printed documents comprising:

a print engine configured to print a test pattern, the test pattern having gloss;

an illuminator configured to direct one or more light beams onto the test pattern to produce at least generally specular reflectance;

a linear array sensor configured to scan the test pattern to obtain image data, the image data including specular reflective image data that corresponds to the generally specular reflectance from the test pattern; and a processor configured to enhance contrast of the specular reflective image data in darker or lower gray levels of the image data to facilitate detection of image quality non-uniformities in the gloss in the test pattern, wherein the processor is configured to amplify only the specular reflective image data in darker or lower gray levels of the image data, excluding all of the image data in light or higher gray levels that does not correspond to the gloss, into a dynamic range of the image data so as to enhance contrast of the specular reflective image data and thereby detect and quantify the image quality non-uniformities in the gloss in the test pattern.

8. The system according to claim 7, further comprising a controller configured to adjust at least one actuator of an image printing system to minimize the image quality non-uniformities in the gloss based on the contrast enhanced specular reflective image data.

9. The system according to claim 7, wherein the image quality non-uniformities comprises at least one of the group consisting of transfer roller ghosting and edge wear.

10. The system according to claim 7, wherein the illuminator comprises at least one of the group consisting of a linear LED array, a lamp, a lamp with a reflector, and a collimated light source.

11. The system according to claim 7, wherein the linear array sensor is a full-width array (FWA) sensor, a contact image sensor, a CMOS array sensor or a CCD sensor.

12. The system according to claim 7, wherein the processor is configured to extract, scale and offset the specular reflective image data in the image data so as to amplify the specular reflective image data into the dynamic range of the image data.

* * * * *